United States Patent [19]

Wood

[11] 4,009,063
[45] Feb. 22, 1977

[54] METHOD OF LINING A PIPE

[75] Inventor: Eric Wood, Ossett, England

[73] Assignee: Insituform (Pipes and Structures) Limited, Horbury Junction, near Wakefield, England

[22] Filed: Jan. 29, 1975

[21] Appl. No.: 544,879

Related U.S. Application Data

[63] Continuation of Ser. No. 282,071, Aug. 21, 1972, abandoned.

[52] U.S. Cl. .................................. 156/71; 61/45 R; 138/97; 138/141; 156/94; 156/148; 156/257; 156/294; 220/63 R; 264/257; 264/269; 264/314; 156/93
[51] Int. Cl.$^2$ ......................................... E03B 7/00
[58] Field of Search ............ 138/97, 141; 61/45 R, 61/45 B, 85; 220/63 R, 64; 156/71, 94, 294, 148, 93; 264/257, 267, 269, 314; 137/14

[56] References Cited

UNITED STATES PATENTS

| | | | |
|---|---|---|---|
| 3,028,284 | 4/1962 | Reeves | 264/257 |
| 3,061,496 | 10/1962 | Meyer | 156/276 |
| 3,093,160 | 6/1963 | Boggs | 264/257 |
| 3,230,129 | 1/1966 | Kelly | 156/294 |
| 3,340,115 | 9/1967 | Rubenstein | 156/294 |
| 3,396,545 | 8/1968 | Lamberton | 61/45 R |
| 3,509,725 | 5/1970 | Schnabel | 61/85 |
| 3,511,734 | 5/1970 | Darrow | 264/269 |
| 3,524,320 | 8/1970 | Turzillo | 61/45 R |
| 3,773,593 | 11/1973 | Casaderall et al. | 156/294 |

Primary Examiner—Edward G. Whitby
Attorney, Agent, or Firm—Harrington A. Lackey

[57] ABSTRACT

A method of lining a passageway with a hard, rigid pipe of thermosetting resin, wherein a tubular fibrous felt is immersed in the resin to form a carrier for the resin. The immersed felt and resin have an inflatable tube therein and this tube is inflated to shape the resin to the passageway surface. The resin is cured to form the hard, rigid lining pipe with the felt embedded therein.

19 Claims, 9 Drawing Figures

METHOD OF LINING A PIPE

This invention relates to the lining of surfaces which define passages, and is a continuation of my co-pending application Ser. No. 282,071 filed Aug. 21, 1972 now abandoned.

In particular the present invention is concerned with the provision of a hard, rigid liner for a pipe or passageway, the purpose being to render an otherwise corroded, eroded and pitted surface smooth, watertight and if necessary gas tight.

BACKGROUND OF THE INVENTION

Frequently passageway or pipe carrier surfaces become or are unsuitable for their intended purpose. For example, a newly formed pipe length for carrying fluid or other medium may have a small fracture or hole, or the inner surface may be imperfectly formed so as to be unsuitable for the intended purpose or in the case of an existing pipe length, the inner surface may have become unsuitable simply as a result of wear and tear through usage. Again, with underground passages, such as sewers and mine shafts, the walls defining such passages may deteriorate as a result of use, so that such surfaces allow the undersirable leakage therethrough into the passage of fluid such as water from the outside of the passage, or the leakage therethrough from the inside of the passage of the fluid being carried by the passage. Also, in the case where an underground passage carries a fluid medium such as sewage, erosion of the surface defining the passage by the flow of the fluid and solid matter therein can make the surface rough and irregular, causing difficulties with the flow of the fluid.

When such a difficulty has arisen in the past, the only course considered available before the present invention, was the replacement of the pipe length or whole pipe in the case of pipelines, or the formation of a new underground passage, in the case of an underground passage.

DISCUSSION OF THE PRIOR ART

Various proposals have been made for the lining of pipes with thin, flexible and gas impermeable sheets, and in one known suggestion, a pipe has its inside lined with a liner sheet formed of a plurality of plies bonded together into a laminated sheet including at least a pair of plies of vinyl plastic sheet material and a ply of fabric backing material. The fabric material serves as a bonding layer between the vinyl sheets and the concrete pipe. This process requires the concrete to be thoroughly cleaned to ensure that the laminate becomes firmly bonded to the concrete. The lining is primarily to isolate the material (sewage) from the concrete on which it has a corrosive action, but the lining adds no strength to the pipe, nor does it provide any additional abrasion resistance. Principally, however, the requirement of thoroughly cleaning the inner surface of the pipe makes the method virtually impractical.

In another known suggestion, a pipe is lined with a plastics liner by placing an adhesive between the liner and surface to be lined, the lining being inflated against said surface. Again, this proposal is basically adhering a flexible lining against the surface to be lined, and again it is necessary to thoroughly clean the inside of the surface, which makes the process impractical or at least very expensive.

In each of the prior arrangements, the good adhesions between the surface to be lined and the lining is imperative, hence the need for thorough cleaning of the surface, because if the adhesions were not perfect, the flexibility of the lining would be such as to result in the lining coming away from the surface, causing considerable repair problems.

BACKGROUND OF THE INVENTION

Heretofore, there have been no proposals for the lining of a pipe or passageway with a hard liner which is not of preformed concrete segments, or is not of concrete cast in situ.

The present invention seeks to achieve the lining of a pipe with a hard liner which does not require the surface initially to be cleaned, does not require to be adhered to the surface, and does not require expensive equipment for the carrying of the invention into effect.

The present invention deals with the lining of pipes and passageways, whereby instead of a pipe length being rejected and replaced or instead of a new underground passage being formed or constructed, the surface can be lined by means of a rigid inner pipe thereby restoring same for further use. Moreover, the invention can also be applied as a precautionary measure where the surface to be lined is not in actual fact faulty, but it is believed may become faulty in the near future. Again, the invention may be employed where the use of a passage changes, such that the existing surface is unsuitable for the new use, and also the invention may be applied simply to reinforce or support a surface defining a passage.

According to the present invention there is provided a method of lining a surface at least partially defining a passageway wherein a laminate of non woven felt and plastics sheet material is urged by fluid pressure against said surface with the felt closer to the surface than the plastics material, said method including the additional steps of totally impregnating the felt with an uncured thermosetting resin so as to completely immerse the felt in the resin, and curing the resin whilst the laminate is held against such surface so as to form a hard, cured resin lining having embedded felt reinforcement on said surface.

Thus, in effect, the felt acts as a carrier for the resin, which eventually forms the hard lining, and keeps the resin in a convenient form until it is cured into the hard lining.

Preferably also, there is an outer tube of material which is relatively impervious to fluids surrounding said fibrous sheet structure.

The fibrous sheet structure preferably includes a mat or web of randomly orientated fibres which may be of glass and/or synthetic fibres. The fibres in the mat may be of differing denier.

It has been found that a mat or web of randomly orientated fibres is very suitable carrier for the resin when impregnated so that a wetted out web or mat carries the maximum amount of resin.

If the mat or web is made up of fibres of uniform thickness then the preferred maximum weight of the fibres is five denier. Thicker fibres up to about ten denier can be used when blended with thinner fibres down to a minimum of one and a half denier. Carrying and absorption of the resin is governed not only by the thickness of the individual fibres but also by the overall density of the felt and one skilled in the art will readily be able to obtain the necessary parameters for the mat or web for absorbing a given quantity of a given resin by a process of trial and error. A particularly suitable felt has been found to be composed of polyester fibres of five denier made into a felt 3/8 of an inch thick and having a density of thirty ounces per square yard.

The web or mat may be needled or carded and may or may not include filamentary reinforcement.

The fibrous sheet structure may include a second sheet in the form of a woven scrim.

The fibrous mat or web may be wrapped round the inner tube with the meeting edges thereof butted together or overlapped, and such edges joined together so that there is no creation of a line of weakness in the tube when it is inflated. Alternatively, the mat or web may be coiled round the inner tube, with the coils axially overlapping.

In the case where a tubular laminate having inner and outer membranes is used, where the fibrous sheet structure is impregnated before use, it may be desirable to take steps to prevent the resin from curing prematurely, and according to a preferred feature of this invention, this is done by immersing the tube in a bath which is maintained by refrigeration at a temperature at which no cure of the resin will occur.

Where the resin is applied to the fibrous sheet structure immediately prior to use, in a preferred arrangement, the tube is fed downwardly to a nip formed by a pair of rollers having compressible, resilient surfaces, cuts are made in the outer layer of the tube and resin is injected into the intermediate layer to form a reservoir within the intermediate layer above the nip rollers, the slit in the tube is patched and this process is repeated at intervals along the length of the tube. The tube is preferably supplied in a flat condition and slits are conveniently made in opposite sides of the flat tube to ensure that the whole of the fibrous sheet structures is wetted out with the resin. Preferably the tube passes downwardly between a number of auxiliary pressure rollers before reaching the nip rollers, these auxiliary pressure rollers helping to work the resin into the fibrous sheet structure of the tube.

It is known that thermosetting resins, in general, shrink when they cure or are cured. This has the effect that the hard tubular liner formed in accordance with the invention may well come away slightly from the surface which it lines. This has no deleterious effect because the shrinkage is small and in any case, the lining is a rigid tube and will not collapse. The advantage of this is that it is not necessary to clean the surface to be cured before the process can be carried out, as has been necessary in the prior proposals for lining tubes with flexible liners. The present invention recognises that hardened thermosetting resin forms an ideal liner for passageways, such as sewers, as it can form an effective barrier between the material flowing along the sewer and the sewer surface, which may be badly in need of repair. The invention is characterised in the utilisation of a tubular laminate having a felt layer which provides an ideal vehicle for achieving the distribution and placement of the liquid resin, which is otherwise difficult to handle.

Figure 1:
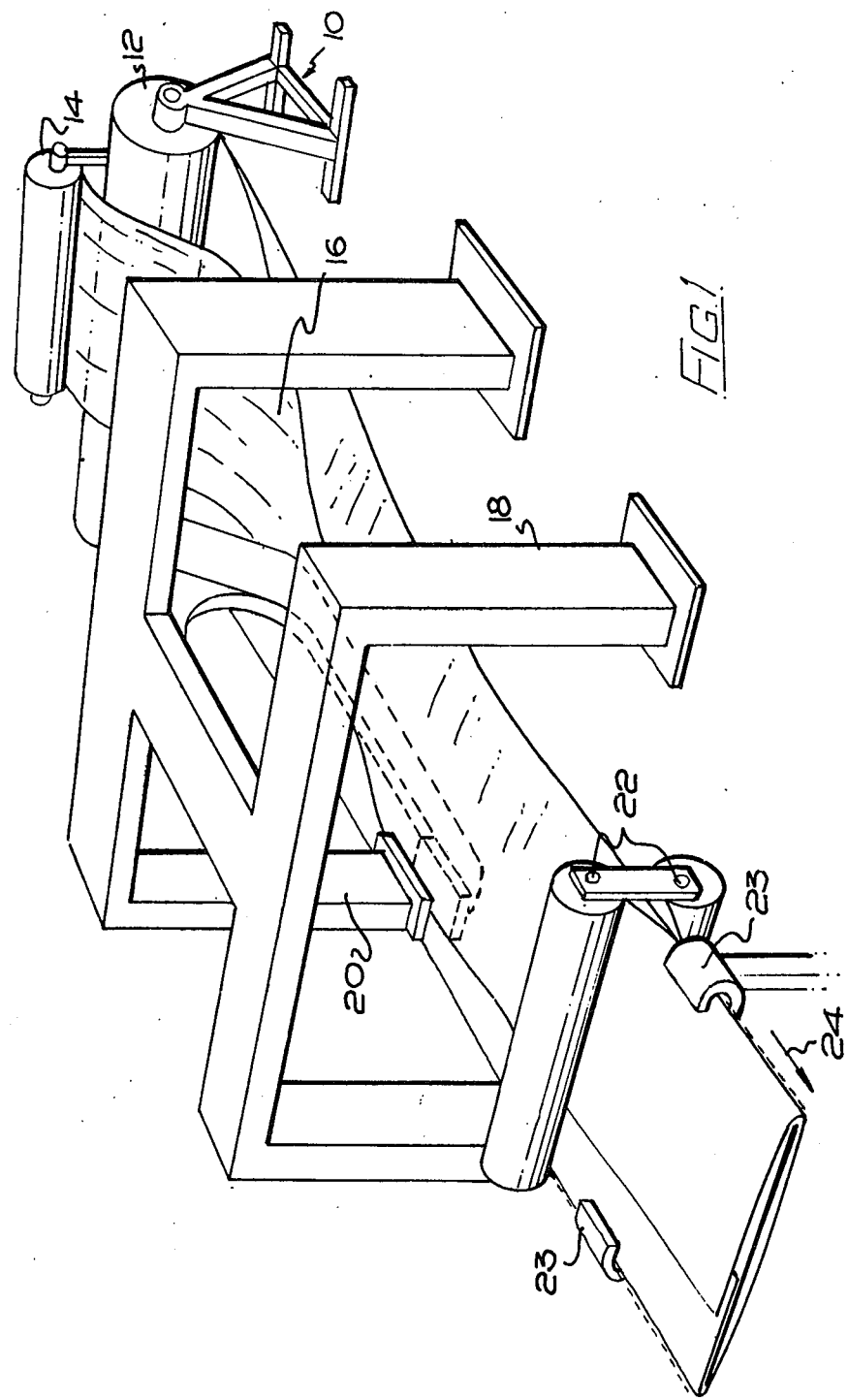
FIG. 1 is a diagrammatic perspective view of an apparatus for producing a tubular laminate for the lining of surfaces defining passageways.

Referring now to the drawings in detail, and firstly to FIG. 1, in this figure there is shown, diagrammatically only, an apparatus for producing a laminate in tubular form for lining pipes or underground passages.

The apparatus comprises basically a stand 10 which carries a roll of fibrous sheet in the form of a needled felt 12 and such felt is fed in web form from the roll 12 as formation of the tubular laminate proceeds.

Figure 2:
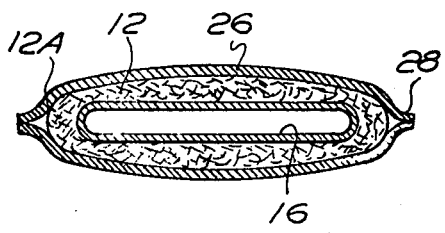
FIG. 2 is a cross sectional view of the tubular laminate in flattened condition.

Adjacent the stand 10 is a further roll stand 14 which carries in roll form a flattened tube of a material which is relatively impermeable to fluids, in this case a synthetic plastics material. In this case the material which is indicated by numeral 16 is polythene, and the tube may be formed in any convenient manner for example by extrusion or by folding and seam welding. In the formation of the tubular laminate, the polythene tube 16 passes over the web of felt as the two are unrolled and the tube 16 and felt 12 are fed past a needling apparatus which is indicated generally by numeral 18. In passing from the stand 10 to the needling apparatus 18 the web 12 which is more than twice the width of the tube 16 is folded over to wrap round the tube as indicated and so that the meeting edges of the felt 12 overlap as shown. These overlapping edges are needled together by the needle pad 20 of needling apparatus 18 so that a tube of felt surrounding the tube of polythene 16 is formed. Instead of needling, these edges may be connected together by adhesive or welding or they may be left unconnected. This formed composite tube passes between a pair of feed rollers 22 each carrying a roll of synthetic plastics film material again of polythene and each of such rolls has a width greater than the width of the composite tube passing therebetween. The sheets of film lying respectively above and below the flattened composite tube are fed from the rolls 22 as movement of the composite tube progresses in the direction of arrow 24 (FIG. 1) and also the overlapping edge regions of the sheets which are fed from rolls 22 are sealed together by heat sealing heads 23 so that in effect there is produced a tubular laminate of the form shown in FIG. 2. It should be noted that this figure is not to scale and the respective layers of the laminate have been shown distinctly in the interests of clarity. FIG. 2 also shows how the felt 12 is immersed in resin 12A which fills the space between layers 16 and 26, for a purpose to be explained. The tubular laminate comprises the inner tube 16 of polythene, the intermediate tube 12 of needled felt and the outer tube 26 of polyethylene constituted by the respective sheets fed from roller 22 which are heat sealed along edges 28 as indicated in FIG. 2. In an alternative method of forming the tube, the inner tube is inflated by fluid pressure whilst the fibrous sheet structure is wrapped round the inflated tube.

In yet a further alternative, a carded web is fed to a mandrel which is rotated, the arrangement being that the web takes up a coiled continuously tubular form fed off continuously from the mandrel, the coils of the web being overlapped, and the inner tube 12 being fed into the coiled web along the mandrel axis.

In order to line say the surface defining an underground sewer, the tubular laminate as indicated in FIG. 2 is first of all treated so as completely to immerse the felt 12 in uncured synthetic resin 12A. This can be done in any suitable manner and one method (illustrated in FIG. 5) we have found to be suitable is to puncture the outer tube 26 and insert the uncured resin by pumping or injection. Another method is to inject the resin by long tubes extending lengthwise of the tube and between the inner and outer tubes. The resin is absorbed quickly by and immerses the felt 12, and if absorption does not take place evenly then the distribution of the resin throughout the felt can be improved by passing the flattened tube through the nip of a pair of nip rollers (see FIG. 5).

Figure 3:
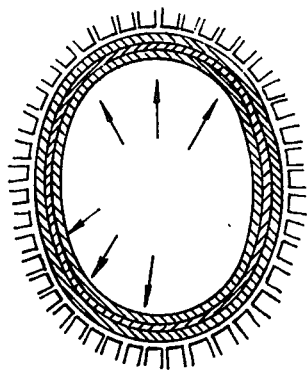
FIG. 3 is a cross sectional view of the tubular laminate when in inflated condition in a passage to be lined.

Whilst the resin remains uncured the tubular laminate is still flexible and in order to line a sewer with the tubular laminate as indicated in FIG. 3 it is simply a matter of entering the laminate into the sewer and then inflating same for example with air under pressure from a fan or blower so that the laminate takes up the shape of the sewer wall as shown in FIG. 3, the tube being closed at its ends to enable inflation to take place or inflated by means of an inflatable bag positioned in the tube. With the tube so inflated, the uncured resin is either allowed to cure naturally or is cured under the action of heat depending upon which type of resin is used so that a hard, rigid lining of cured resin is formed in the passageway. by inflating the tube, the tube is pressed outwardly against the sewer wall indicated by the arrows in FIG. 3. FIGS. 5, 6, 7, 8 and 9 to be referred to later illustrated in detail the placement of the tubular laminate in the sewer.

Figure 4:
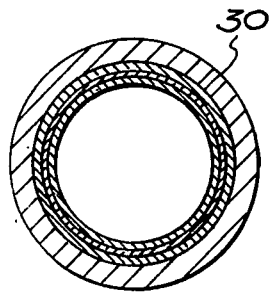
FIG. 4 is a sectional elevation showing how a pipe may be provided according to the invention with a tubular lining.

FIG. 4 shows how the tubulr laminate may be used for the lining of a pipe 30.

To line a complete sewer or pipe line with rigid linings, it may be necessary to use a number of tubular laminates which are overlapped and/or joined end to end but the technique of using fluid pressure to urge each laminate against the surface to be lined is followed in each case.

The inner tube 16 may be of a material which is or becomes firmly bonded to the resin carried by felt 12 or alternatively after the curing of the resin, it may be capable of removal from the cured resin depending upon the materials used for the tube 16 and the resin which is used.

Figure 5:
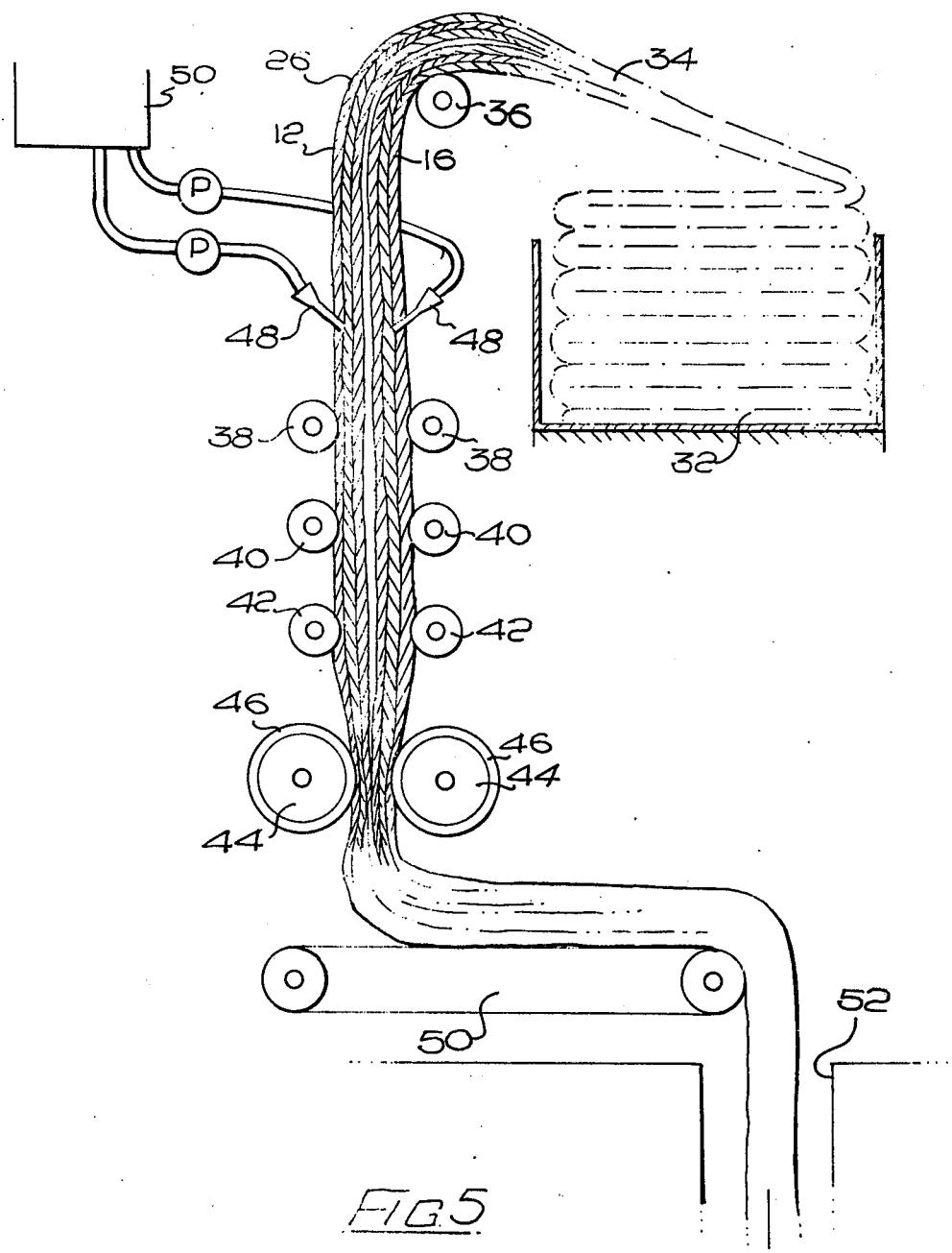
FIG. 5 illustrates diagrammatically how a tubular laminate such as illustrated in FIG. 2 may be fed into an underground passage for the lining of same.

Referring to FIG. 5, a preformed tubular laminate such described with reference to FIG. 2 is folded into a receptacle 32 from which the tube 34 is fed over a top roller 36. The tube 34 is fed downwardly through pairs of intermediate pressure rollers 38, 40 and 42 into the nip of a pair of rollers 44 each of which has an outer surface of compressible resilient material 46 such as polyurethane foam. The tube coming from the container 32 has no resin in the fibrous sheet 12 and to insert the necessary resin two operators are stationed one to each side of the flat band of tubing before it reaches the rollers 38. To inject the required resin into the fibrous mat, each operator makes a cut through the outer layer 26 of the tube and inserts into the cut a nozzle 48 which may be supplied with resin from a reservoir 50 by way of pumps P. After making the cut, the operator starts the pump and continues running the pump until sufficient resin has been injected into the fibrous mat to form a reservoir extending upwardly from rollers 44 to the height of the nozzles 48. It will be understood that during this time the tube will be moving slowly downward and the operator will be moving the nozzle downwardly with the tube. When sufficient resin has been injected into the fibrous mat each operator switches off his pump, removes the nozzle and applies a patch to the slit that has been cut in the tube. The patch may conveniently be a patch of self adhesive plastics material. The patch is applied to the tube before this reaches the topmost pair of rollers 38 and it will be understood that the operators must make the cuts in the outer layer 26 sufficiently far above these rollers 38 to allow enough resin to be injected and the patch applied while the cut part of the tube is travelling towards the rollers 38 and before it reaches these rollers. As the tube travels downwardly between rollers, 38, 40 and 42, these help to immerse the fibrous mat in resin, and this is finally completed in the nip between rollers 44. Once the length of tube containing resin with immersed felt as the intermediate layer approaches the nip rollers 44 each operator cuts a further slit in the outer layer 26 and injects more resin into the intermediate layer, subsequently applying a patch as previously explained. This procedure is repeated along the length of the tube leaving the rollers 44 has the fibrous mat fully immersed in the resin.

On leaving the rollers 44, the tube is received by a conveyor belt 50 which, when the tube is to be installed underground moves the tube towards and lowers it into a manhole 52.

The conveyor 50 is driven by a positive drive which can not be overrun. This achieves a uniform feed of the tube which would otherwise be difficult to obtain. If the tube is being lowered to any substantial depth then the weight of that part of the tube that is being lowered at any one time can be very high. This could have the effect of the tube driving the conveyor faster, but this is prevented by providing the conveyor with a drive that cannot be over run. The frictional engagement between the conveyor and the length of the tube resting on the conveyor thus acts as sufficient of a brake to support the length of tube that is being lowered into the manhole. Furthermore, the tube is lowered without applying any clamping or squeezing force to the tube, which is important as the resin is still in liquid state and if the tube were clamped or squeezed some local displacement of resin could occur, leading to non-uniform properties in the hard tube after curing of the resin. In order to achieve the non-over running effect in the drive to the conveyor 50 the drive may incorporate an irreversable worm and pinion or the drive may be by way of an electric motor with inductive breaking.

Figure 6:
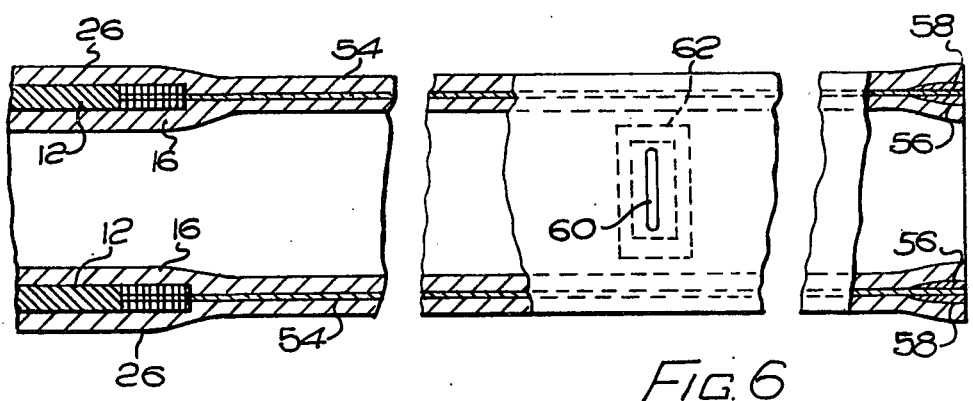
FIG. 6 is a sectional elevation showing the end detail of a tubular laminate such as is shown in FIG. 2.

For handling the tube in this way, it may be desirable to provide the tube with some form of reinforcement at the ends. In this connection FIG. 6 shows the trailing end of a tube, the majority of the length of which comprises the inner and outer layers 16 and 26 of flexible polymeric material and the intermediate fibrous mat 12 which is immersed in resin. The mat 12 is, at the end of this mat stitched to a length 54 of a strong woven fabric formed into a tube. The preferred fabric is a plain woven polypropylene. The polypropylene is covered on both sides by the respective inner and outer layers 16 and 26 of polymeric material. At the end of the tube the polypropylene is anchored to the polymeric material by two strokes 56 and 58 of a double-sided self-adhesive tape. In advance of the end s slit 60 is cut completely through one part of the wall of the tube and reinforcing double-sided self-adhesive material 62 is stuck between the outer layer 26 and the fabric 54 and between the inner layer and the fabric 54 around this slit, to prevent air entering the resin during the installation of the tube. This slit 60 and patches 62 are only provided at the trailing end of the tube, and the leading end of the tube, while it is provided with the extension 54 of woven material does not have these added features.

To insert this pipe into, for example, a sewer a rope 64 is attached to the leading end of the tube and is taken down a first manhole 68, and led along the sewer 70 to a pulley 72 from which the rope extends up a second manhole 74 to a winch 76. Before inserting the tube it may be desirable to place a polyethylene liner in the sewer to provide a smooth surface for the tube to be pulled along. This liner may be inflated at very low pressure during installation of the tube. The leading end of the tube is threaded through the rollers 38–44, shown in FIG. 5 and is led along the conveyor 50 and down the first manhole 68. When the end of the fabric 54 is about to reach the rollers 44 slits are cut in the tube as described with reference to FIG. 5 and the first batch of resin is injected into the intermediate layer of the tube. Feed of the tube down through the rollers 38 to 44 and long the conveyor 50 and so into the manhole 68 then takes place at a slow constant rate, resin impregnation being carried out by cutting the tube, inserting the nozzles and patching the cut as already described. As the tube is lowered into the sewer it is pulled along the sewer by winding up the rope 64 onto the hand winch 76. The rope 64 is, of course, secured to the leading end 78 of the tube, this leading end having the polypropylene fabric section 54. As the last part of the resin reinforced tube moves over the conveyor 50 to the manhole 68 the frictional engagement between the tube and the conveyor will of course decrease, as the length of tube on the conveyor decreases. Accordingly, the weight of tube hanging down the manhole 68 may be sufficient to pull the tube from the conveyor so that it falls down the manhole in an uncontrolled manner. To prevent this the trailing end section 80 of the tube, incorporating the polypropylene reinforcement 54, is held to control the lowering of the remainder of the resin impregnated tube, and this holding may be effected by clamping the polypropylene reinforced trailing end to the conveyor 50 with a clamp 82.

When the tube has been laid in the sewer the polypropylene reinforced ends of the tube are both sealed off as at 84 and 86. An air hose 88 having an end formed by a rigid ring 90 is then inserted into the tube by passing the ring 90 through the slit 60 and turning the ring so that it is blocked behind the slit 60, somewhat in the manner of inserting a button into a buttonhole. With the air hose in position, air can be blown into the tube from a fan 92. As the air enters the tube the tube is inflated so that it is pressed against the walls of the sewer 70 and takes up a shape conforming to the walls of the sewer. As the tube is inflated the air tends to move the closed polypropylene ends apart to tension the tube and ensure that wrinkles are removed therefrom. Air pressure is maintained in the tube until the resin in which the intermediate layer 12 is immersed is cured hard forming a complete rigid lining tube. In order to prevent build up of heat in the tube which could result in melting of the inner lining 16, the downward end of the tube is preferably cut to form an opening 94 after initial inflation of the tube is complete. There is thus a through flow of air through the tube carrying away any generated heat and keeping the temperature inside the tube down to a reasonable level. However, the fact that air is escaping through this hole 94 does not affect inflation of the tube which still remains pressed firmly against the walls of the sewer. This use of the fan and an orifice at the downstream end of the tube is thus advantageous. Once the resin has been cured then the ends of the tube are cut off along the dotted lines of 96 and these ends are removed from the sewer by way of the manholes. The inner polyethylene layer 16 may be left in position in the tube in the sewer if desired, or this may also be pulled out of the sewer. It is found that the resin in which is immersed fibre reinforcement layer 12 when cured forms a hard, smooth impermeable pipe resistant to attack by most liquids and therefore capable of carrying these liquids directly without a polyethylene lining.

In the technique described in the foregoing paragraphs the work is carried out with the normal flow through the sewer stopped by a dam 98. In an alternative method, it is possible to reline a sewer or other pipe or passage while substantially maintaining the flow therethrough, and such an alternative method is illustrated in FIGS. 8 and 9 of the accompanying drawing, which show respectively the upstream and downstream ends of the tube when installed in the sewer.

Figure 8:
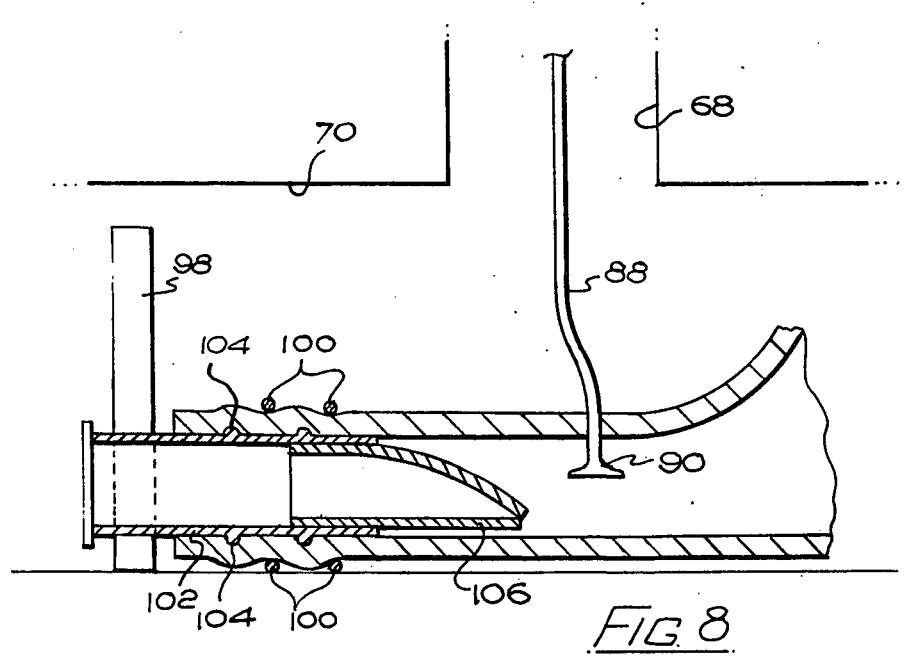
FIGS. 8 and 9 illustrate in diagrammatic sectional elevation the ends of a tubular laminate which lines a sewer whilst the flow of sewage along the sewer is maintained.
Figure 9:
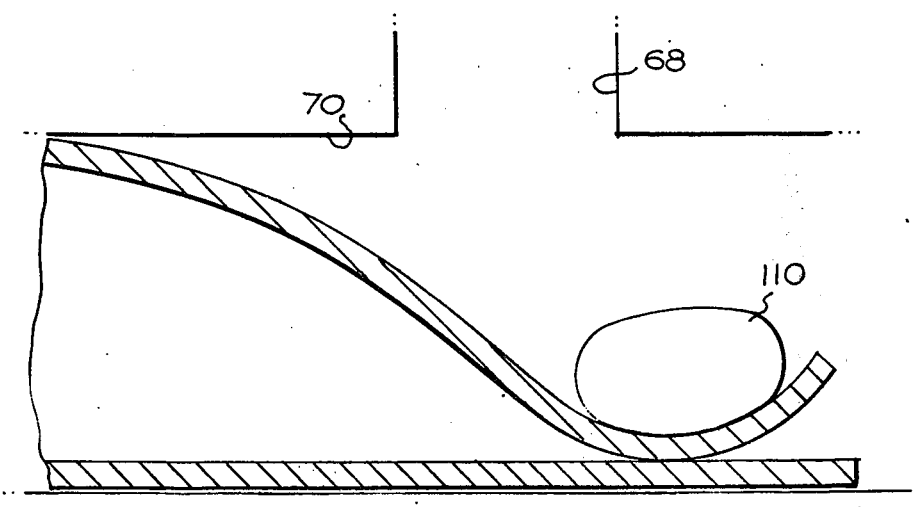

Referring to FIG. 8, when a flow is to be maintained through the sewer the trailing end of the tube with the polypropylene reinforcing fabric 54 is secured by rings 100 to a valve tube 102 having an outer surface formed with ribs 104. The rings and ribs ensure that a good seal is formed between the sewer lining tube and the valve tube 102. The valve tube 102 incorporates a flat valve member 106 of flexible resilient material. The upstream end of the valve tube 102 is passed through an opening in a dam 108 located in the sewer. At the downstream end of the sewer lining tube, as shown in FIG. 9, the end of the tube which is reinforced with polypropylene fabric has a sandbag 110 or other weight placed upon it to seal off the end of this tube.

Figure 7:
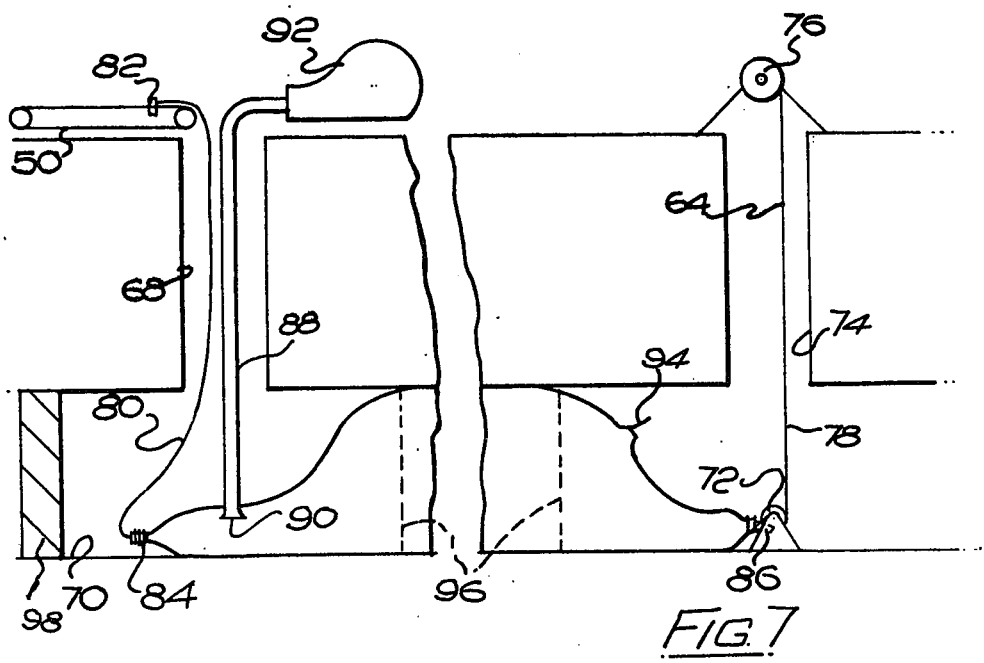
FIG. 7 illustrates diagrammatically the method by which an underground passage is lined using a tubular laminate as illustrated in FIG. 6.

After insertion of the lining tube into the sewer, the air hose is inserted into the slit through the tube as already described with reference to FIG. 7 and air is blown into the tube. The pressure of this air holds the flap valve member 106 closed against the pressure of water on the upstream end of the flap valve. The lining tube is inflated into contact with the walls of the sewer, and the sandbag 110 at the downstream end of the lining tube prevents the air from being blown straight through the lining tube. When the tube is fully inflated an air vent 94 is cut in the downstream end of the tube to allow a through flow of air as already explained. The water in the sewer will eventually rise behind the dam 108 to a level wherein the pressure of the water is sufficient to overcome the closing effect of the air pressure in the lining tube on the valve 106, and flow of water through the valve 106 into the lining tube will then commence. This flow reaches the sandbag 110 at the downstream end of the lining tube and will build up behind the sandbag until the pressure is sufficient to lift the sandbag to allow water to flow on down the sewer. When the sandbag is lifted the water will block the whole of the passage through this end of the lining tube, so that the only air exit from the lining tube is the orifice 94 and excess release of air from the tube is not possible. A normal flow through the sewer can thus be maintained throughout the whole of the period that the lining tube is inflated and the resin is curing. After the resin is fully cured the end parts of the lining tube are cut off as already described with reference to FIG. 7 and this operation can, of course, be carried out without interrupting flow through the sewer. The only period during which flow through the sewer may be interrupted is therefore that time needed to lower the lining tube into the sewer and move it through the sewer into its final position. However, it may not even be necessary to stop flow for this period of time, and in fact a continued flow may assist in moving the tube through the sewer as the flow will tend to float the tube down the sewer.

In a modification of this latter method, by building the dam 108 up higher than otherwise might be necessary and allowing a flow of water through the lining tube before inflating this with air, the water flow itself can seal off the downstream end of the tube to prevent excess air escaping and there is no need for the sandbag or weight 110. In a further variation of the check valve 106 and a downstream water regulating valve may be fitted into opposite ends of a pilot tube extending through the sewer lining tube so that the through flow of water runs in the pilot tube only and is not in contact with any of the materials of the lining tube. In this modified method the pilot tube must be removed from the sewer lining tube as part of the finished operation.

In some cases it may be possible to dispense with the outer tube 26 in which case the resin in which the felt is immersed would be applied directly to the surface to be lined.

Once curing of the resin is complete the formed liner pipe simply remains in position in the pipe line or in the sewer and additional anchoring devices may be used if desired.

Because the tubular laminate has to be inflated to take up the final shape lining a sewer or pipe line it is preferred that the materials which are used for the tubular laminate be somewhat elastic and capable of some extension in order to obviate the need for accurate dimensioning of the tubular laminate in relation to the passageway which is to line.

It is to be appreciated that a number of possible materials may be used instead of or in combination with the felt, the requirement being that there should be a fibrous sheet structure which is immersed in and serves as a carrier for uncured resin in a convenient form to enable the shaping of the laminate to the surface to be lined. Such fibrous sheet structure may also be reinforced by filamentary or other materials and it may include a sorim web to which the felt web is attached to example by needling to give the fibrous sheet structure strength and stability. The sheet structure may be a carded felt or woven or knitted sheet and it may include or be composed of a glass fibre mat or rovings.

In the preferred case, we utilise a felt of synthetic fibres such as polyester, nylon or acrylic fibres. Polyester fibres are preferred because they have the highest degree of chemical resistance. The fibres in any needled felt may include fibres of differing denier.

In some cases so called "bright" fibres or clear fibres are used for the needled web and these are impregnated with a clear resin to give a transparent liner.

The resin which is used is preferably a low exotherm resin i.e. a resin which releases little heat as it cures or is cured, and if a resin which releases substantial heat whilst curing is used then care should be taken to select a material for the inner and outer tubes 16 and 26 and layers 340 and 360 (in the case of a sheet laminate) which will withstand the heat generated during the curing. We use mainly polyester resin although epoxy resin can also be used. Polyester resin has the advantage that it cures naturally and by the use of a catalyst the curing time can be varied. With a polyester resin having a cobalt accelerator we have used a catalyst cyclohexanolperoxide. The resin may contain any one or more additives, such as fillers, colourants, fire retardants, etc., as desired. Nearly all thermosetting resins shrink during curing, and rigid hard lining pipes formed in accordance with this invention may come away from the surfaces which they line. This is of no consequence, as the shrinkage is small, and the rigid structure still adequately performs its function.

The material which is used for the inner tube 16, the outer tube 26 and the outer layers 340 and 360 as previously described may be any suitable synthetic plastics or other material and examples of such materials are polythene, polyvinylchloride, butyl, rubber, cellophane nitrate, neoprene and polyester film. Where a tubular laminate is formed it is preferred that the inner tube be formed of a material which is of relatively high impermeability to fluids so that the laminate can be shaped with fluid pressure and there will be no leakage through the liner; normally the outer tube of the laminate will be of the same material although this is not essential as the requirement for impermeability in the outer tube is not normally as high as in the inner tube because the fluid pressure will normally be applied in the inner tube to form the tubular laminate to the passageway to be lined. The materials of the outer and inner tube can of course be indifferent as desired.

The immersion of the fibrous sheet structure in the resin may be carried out during the formation of the laminate instead of by injection as described herein but in such case it will be necessary either to refrigerate the laminate to prevent the resin from curing or to use the laminate before the resin cures as otherwise it will not be possible to form the laminate satisfactorily to the desired shape of the passage.

We feel that the advantages of this invention are fairly clear insofar as by this invention it is possible to line the surface of a passage such as a sewer with a synthetic resin which cures hard and forms an effective liner pipe for the passage such as will in many cases render the repair or replacement of the passage unnecessary and there is no requirement initially to clean the surface to be lined. The same comment also applies to pipes which may or may not be located underground. Instead therefore of a damaged or old pipe being replaced it may simply be lined according to the method of the invention and this will, in many cases, render the pipe as serviceable as it was when new.

I claim:

1. A method of lining a surface at least partially defining a passageway wherein a laminate of non woven felt sandwiched between an outer membrane and an inner membrane of plastics sheet material is urged by fluid pressure so that said outer membrane lies against said surface, said method including the additional steps of totally impregnating the felt with an uncured thermosetting resin so as to completely immerse the felt in the resin, and curing the resin while the laminate is held against such surface so as to form a hard, cured and selfsupporting resin lining having embedded felt reinforcement.

2. The method in accordance with claim 1, wherein the felt is impregnated with the resin before it is laminated between said plastics material membranes.

3. The method according to claim 1 wherein the felt is impregnated with resin after it is laminated between said plastics material membranes.

4. The method according to claim 1, wherein the laminate is in tubular form and comprises an inner tube of said plastics material around which is disposed the non woven felt and an outer tube of plastics materials surrounding the felt, the method comprising inflating the tubular laminate against and into the shape of said surface.

5. The method according to claim 4, wherein said surface comprises the inner surface of an underground sewer, and the tubular laminate is fed down a manhole to the sewer and is inflated against the inner sewer surface when in position.

6. The method according to claim 4, further including injecting the resin into the felt through slits in the outer tube of plastics material at spaced intervals along the tubular laminate length.

7. The method according to claim 6, wherein the tubular laminate is passed between nip rollers to distribute evenly the uncured resin throughout the felt.

8. The method according to claim 5, wherein the ends of the tubular laminate are closed while it is inflated when in the sewer.

9. The method according to claim 8, wherein the ends are closed by sealing.

10. The method according to claim 8, wherein one end is closed by a valve member whilst the other end is closed by a weight while the tube is inflated, the valve member being designed to open and allow the flow of sewage through the inflated tube when the head of sewage being held back by the valve member exceeds the air pressure in the tubular laminate, and the weight being of such magnitude that it lifts to allow flow of sewage out of that end of the laminate while maintaining that end closed to air flow.

11. The method according to claim 8, wherein the ends of the tubular laminate are closed by the ends of a pilot pipe passing through the tubular laminate and through which a flow of sewage is maintained while the laminate is inflated.

12. The method according to claim 8, wherein the tubular laminate is punctured to allow escape of air when it has been inflated to a condition engaging the sewer surface.

13. The method according to claim 8, wherein the ends of the laminate are cut off after the resin has cured.

14. The method according to claim 4, wherein the method includes wrapping the felt round the inner tube and overlapping and joining together.

15. The method according to claim 1, wherein the fibres of said non-woven felt are polyester fibres.

16. A method according to claim 1, wherein the resin is a polyester resin.

17. A method according to claim 1, wherein the plastics sheet material is polyethelene.

18. A method according to claim 1, wherein the resin is cured by a natural curing process.

19. A method according to claim 1, wherein the resin is cured by a forced curing process.

* * * * *